April 14, 1931.  C. B. CAIN  1,800,599

TAG FOR BICYCLE TIRES AND THE LIKE

Filed Oct. 11, 1929

INVENTOR.
Charles B. Cain.
BY
ATTORNEY.

Patented Apr. 14, 1931

1,800,599

UNITED STATES PATENT OFFICE

CHARLES B. CAIN, OF LAKE, WISCONSIN, ASSIGNOR TO THE FISK RUBBER COMPANY, OF CHICOPEE FALLS, MASSACHUSETTS, A CORPORATION OF MASSACHUSETTS

TAG FOR BICYCLE TIRES AND THE LIKE

Application filed October 11, 1929. Serial No. 398,910.

My invention pertains to a tag for attaching to annular articles such as bicycle tires.

When bicycle tires are stored or shipped they are usually supplied with a tag of instructions, etc., which has been usually tied with a string to the tire. In the handling of the tires these tags are quite often lost due to the string breaking or the tag tearing off of the string.

The object of my invention is to provide a tag for attachment to bicycle tires that may be quickly and easily applied without the use of string or other attaching agents. Another object of my invention is to provide a tag which may be secured to a bicycle tire in such a manner so as not to extend, to any marked degree, from the tire and which will stay in a position to be easily read.

In the accompanying drawings which illustrate one embodiment of my invention,

Figures 3, 4:
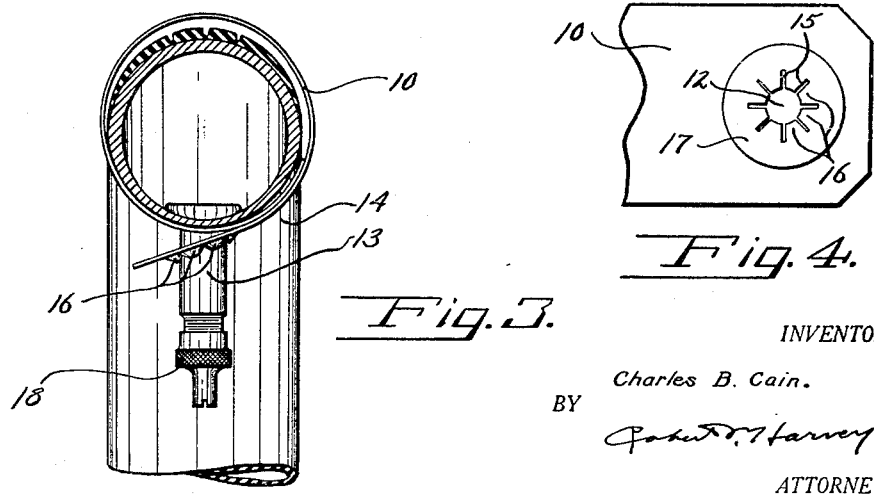
Fig. 3 is a view taken substantially on line 3—3 of Fig. 1.
Fig. 4 is a view of a modification of the gripping end of the tag.

In the drawings the tag is shown as comprising a paper or fibrous strip 10 provided at one end with an elongated slot 11 and at the other with a valve gripping opening 12, made just long enough so that the slot 11 may be brought over a valve stem 13 in a tire 14, the tag looped about the tire and the opening 12 pressed down over the stem. In order that the opening 12 will hold its position on the stem 13 the actual opening is made substantially the same diameter or smaller than the outside diameter of the smallest valve stem used in the tires. A plurality of incisures 15 extending from the opening 12 form segmental portions 16 which will yield when the tag is brought over the stem 13 and exert a holding pressure on the stem. Although preferably made without reinforcements the nature of tag material used may require the addition of reinforcements 17 as shown in the modification, (Fig. 4) the parts otherwise being the same.

Figure 1:
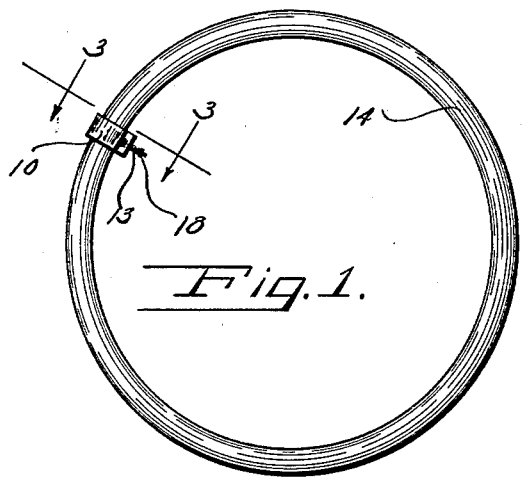
Fig. 1 is a view of a tire provided with a tag made in accordance with my invention.
Figure 2:
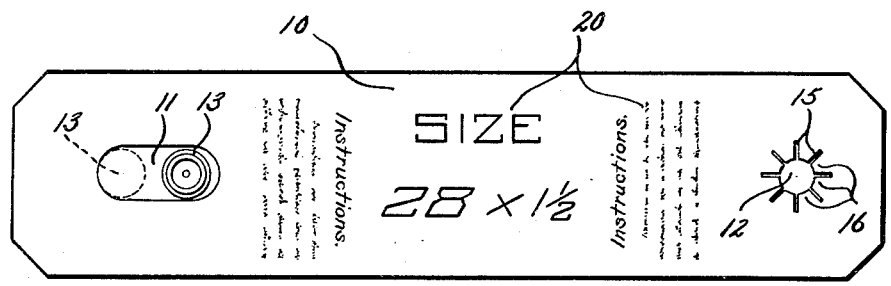
Fig. 2 shows the preferred type of tag.

In using my invention the slot 11 in the tag is brought over the stem 13 and pulled around the tire so that the stem will take the position shown by dotted lines in Fig. 2. The tag is then of sufficient length to allow the opening 12 to be brought over the stem and forced down to overlie the opposite end of the tag. The tag 10 will then fit freely but securely, being held by the stem 13 about the tire, the stem may now be positioned substantially as shown in full line position in Fig. 2 and functional contact with the stem and tire will tend to keep it there. A valve cap 18 added after the positioning of the tag 10 will help in retaining the tag in place due to the added length it gives the stem 13 as well as the shoulders it presents to catch on the portions 16.

The tag structure described eliminates the disadvantages of tags tied to the tire by a string and is more economical to manufacture and apply. The printed matter indicated at 20 is always in position to be read.

Having thus described my invention, I claim:

A tag for bicycle tires which comprises an elongated fibrous strip, an aperture in one end of the strip adapted to fit over the valve stem of the tire, and an aperture in the other end of the strip having a plurality of radially flexible members formed by a plurality of incisures extending outwardly from the said aperture, said flexible members being adapted to be forced out of the plane of the strip when the latter is forced over a valve stem to engage the body of the stem, the distance between the said apertures being great enough to allow the strip to encircle the tire when the apertures are over the valve stem.

CHARLES B. CAIN.